United States Patent
Park et al.

(10) Patent No.: US 8,988,044 B2
(45) Date of Patent: Mar. 24, 2015

(54) BATTERY PACK

(75) Inventors: Seokryun Park, Yongin-si (KR); Youngho Kim, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 533 days.

(21) Appl. No.: 12/399,357

(22) Filed: Mar. 6, 2009

(65) Prior Publication Data

US 2009/0302804 A1 Dec. 10, 2009

(51) Int. Cl.
*H02J 7/00* (2006.01)
*H01M 2/14* (2006.01)
*H01M 10/42* (2006.01)
*H01M 2/02* (2006.01)
*H01M 2/10* (2006.01)
*H01M 2/22* (2006.01)
*H01M 2/34* (2006.01)
*H01M 10/48* (2006.01)
*H01M 10/0525* (2010.01)

(52) U.S. Cl.
CPC ........ *H01M 10/4235* (2013.01); *H01M 2/0215* (2013.01); *H01M 2/1061* (2013.01); *H01M 2/22* (2013.01); *H01M 2/34* (2013.01); *H01M 2/348* (2013.01); *H01M 10/4257* (2013.01); *H01M 10/486* (2013.01); *H01M 10/0525* (2013.01); *H01M 2200/00* (2013.01); *H01M 2200/106* (2013.01)
USPC ............ 320/112; 320/107; 362/183; 429/129

(58) Field of Classification Search
USPC ........... 320/112, 107; 362/183; 429/100, 126, 429/133, 149
See application file for complete search history.

(56) References Cited

U.S. PATENT DOCUMENTS

| | | | |
|---|---|---|---|
| 6,402,690 B1 * | 6/2002 | Rhee et al. | 600/300 |
| 6,524,732 B1 | 2/2003 | Iwaizono et al. | |
| 7,318,978 B2 * | 1/2008 | Sakuma et al. | 429/61 |
| 7,391,184 B2 * | 6/2008 | Luo et al. | 320/137 |
| 2003/0008208 A1 | 1/2003 | Yamazaki | |
| 2003/0108780 A1 | 6/2003 | Iwaizono et al. | |
| 2003/0162083 A1 * | 8/2003 | Sakuma et al. | 429/61 |
| 2003/0170530 A1 * | 9/2003 | Nishimura et al. | 429/61 |

(Continued)

FOREIGN PATENT DOCUMENTS

| CN | 1297590 A | 5/2001 |
|---|---|---|
| CN | 101098054 A | 1/2008 |

(Continued)

OTHER PUBLICATIONS

Chinese Office Action dated Feb. 16, 2011 for Chinese Application No. CN200910133374.X corresponding to Korean Patent Application No. KR 10-2008-0053204 (A) which corresponds to the captioned application.

(Continued)

*Primary Examiner* — Drew A Dunn
*Assistant Examiner* — Steve T Chung
(74) *Attorney, Agent, or Firm* — Knobbe Martens Olson & Bear LLP (57) ABSTRACT

A battery pack including: a bare cell including a cathode and an anode; and a chip on board (COB) module electrically coupled to the cathode and anode of the bare cell. The COB module controls the charging/discharging of the bare cell. The COB module can be commonly used in different types of batteries and can be connected to a variety of electric devices.

15 Claims, 7 Drawing Sheets

(56) References Cited

U.S. PATENT DOCUMENTS

| | | |
|---|---|---|
| 2003/0211385 A1 | 11/2003 | Yamazaki et al. |
| 2004/0251872 A1* | 12/2004 | Wang et al. ................ 320/112 |
| 2005/0130030 A1* | 6/2005 | Watanabe et al. ............ 429/100 |
| 2007/0037048 A1* | 2/2007 | Takeshita et al. ............... 429/99 |
| 2007/0188133 A1* | 8/2007 | Nakano et al. ................ 320/112 |
| 2007/0194753 A1* | 8/2007 | Sumida et al. ................ 320/112 |
| 2007/0298287 A1 | 12/2007 | Tajima et al. |
| 2008/0094032 A1 | 4/2008 | Miyamoto et al. |
| 2008/0096101 A1* | 4/2008 | Kwag et al. .................. 429/121 |
| 2008/0118825 A1* | 5/2008 | Yoon ........................... 429/122 |
| 2008/0187823 A1* | 8/2008 | Byun et al. ................... 429/122 |
| 2008/0226980 A1* | 9/2008 | Kim .............................. 429/164 |
| 2008/0241654 A1* | 10/2008 | Koh et al. ..................... 429/100 |
| 2008/0292955 A1* | 11/2008 | Byun et al. ................... 429/163 |

FOREIGN PATENT DOCUMENTS

| | | |
|---|---|---|
| EP | 1 919 009 A2 | 5/2008 |
| JP | 2003-7282 A | 1/2003 |
| JP | 2004-304019 A | 10/2004 |
| JP | 2006-4773 | 1/2006 |
| JP | 2006-4773 A | 1/2006 |
| JP | 2007-274866 | 10/2007 |
| KR | 10-0770106 B1 | 10/2007 |
| KR | 10-0943594 | 2/2010 |

OTHER PUBLICATIONS

English-language abstract of KR 10-2007-0096647.

Chinese 2nd Office Action dated Jul. 13, 2011 for Chinese Patent Application No. 200910133374.X which shares priority of Korean Patent Application No. KR 10-2008-0053204 with captioned U.S. Appl. No. 12/399,357.

European Search Report dated Nov. 13, 2009 in European Patent Application No. 09251453.8 corresponding to Korean Patent Application No. 10-2008-0053204.

* cited by examiner

BATTERY PACK

CROSS-REFERENCE TO RELATED APPLICATION

This application is based on and claims priority to Korean Patent Application No. 2008-53204 filed on Jun. 5, 2008, in the Korean Intellectual Property Office (KIPO), the disclosure of which is hereby incorporated by reference.

BACKGROUND OF THE INVENTION

1. Field of the Invention

Aspects of the present disclosure relate to a battery pack.

2. Description of the Related Art

Generally, a battery pack is formed by electrically coupling a bare cell to a protection circuit board. The bare cell includes an electrode assembly and an electrolyte, which are sealed in a can. The bare cell is charged or discharged according to a reversible chemical reaction. The protection circuit board protects the bare cell from overcharges and over-discharges, by controlling the current flow of the bare cell. The battery pack can be mounted on an electronic device.

The protection circuit board includes chip-type electrical elements that are mounted on an insulating substrate, by a surface mount technology (SMT) process. Each electrical element is individually mounted on the substrate. Accordingly, if the design of the protection circuit board is even slightly changed, the manufacturing time thereof is greatly increased, especially when the protection circuit board is mass-produced.

SUMMARY OF THE INVENTION

According to an aspect of the present disclosure, there is provided a battery pack that includes: a bare cell having a cathode and an anode; and a COB module electrically coupled to the bare cell, to control the charging/discharging of the bare cell.

Additional aspects and/or advantages of the invention will be set forth in part in the description which follows and in part, will be obvious from the description, or may be learned by practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings, of which:

FIG. 1b is an exploded perspective view illustrating a partially assembled state of the battery pack of FIG. 1a;

FIG. 1d is a bottom view illustrating a COB module of FIG. 1a;

FIG. 1f is a plan view of a seating substrate of FIG. 1a;

DETAILED DESCRIPTION OF THE EXEMPLARY EMBODIMENTS

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

As referred to herein, when a first element is said to be disposed or formed "on", or "adjacent to", a second element, the first element can directly contact the second element, or can be separated from the second element by one or more other elements located therebetween. In contrast, when an element is referred to as being disposed or formed "directly on" another element, there are no intervening elements present. As used herein, the term "and/or" includes any and all combinations of one or more of the associated listed items.

Figure 1A:
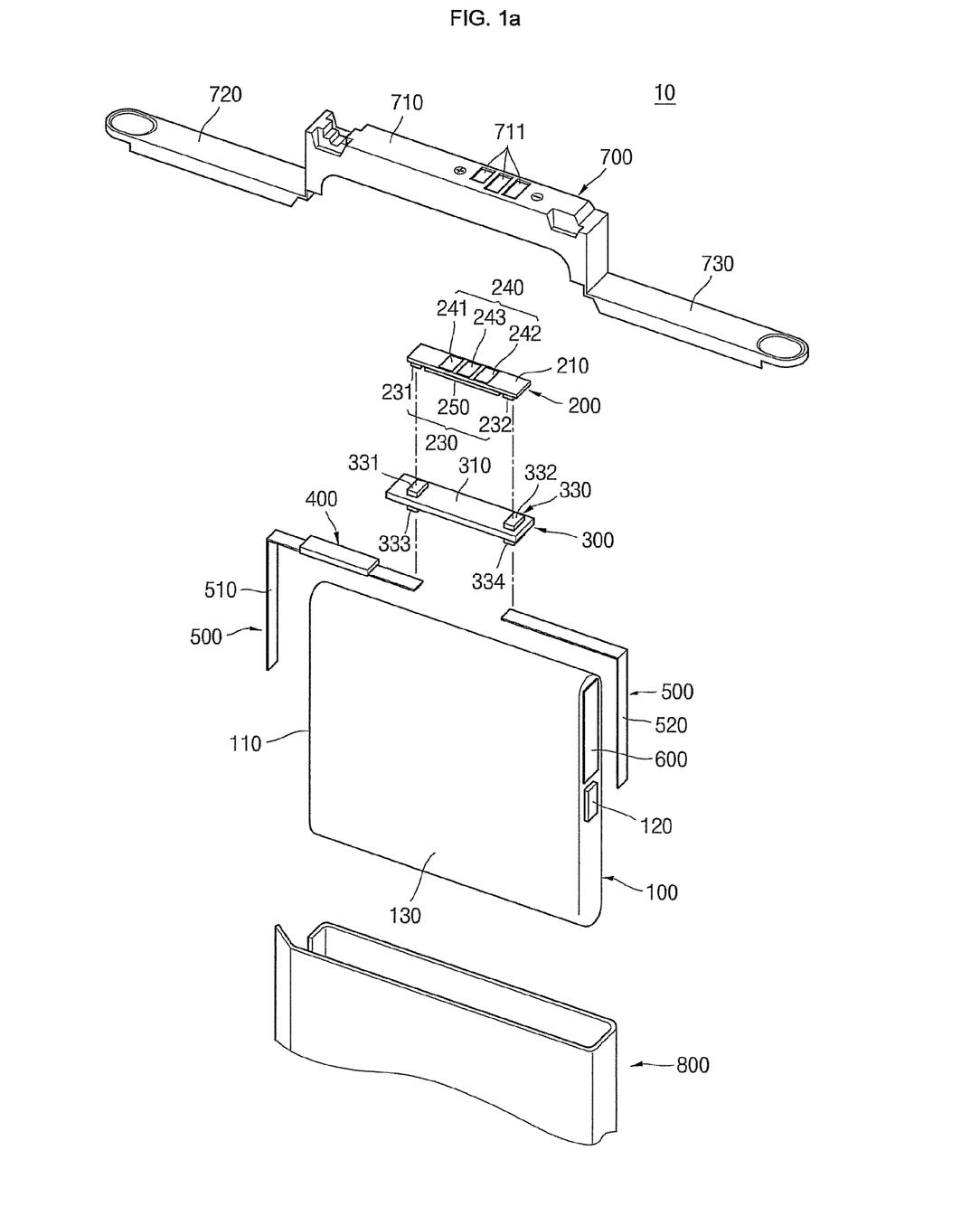
FIG. 1a is an exploded perspective view illustrating a battery pack, according to one exemplary embodiment of the present disclosure.
Figure 1B:
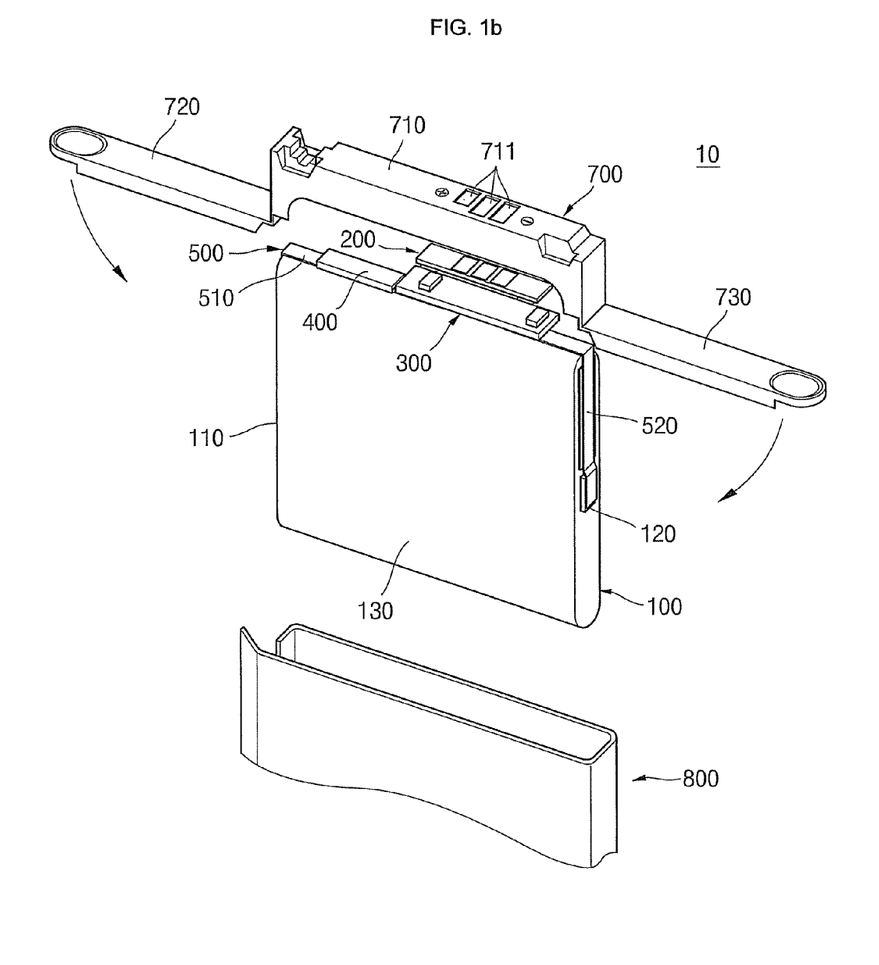
Figure 1C:
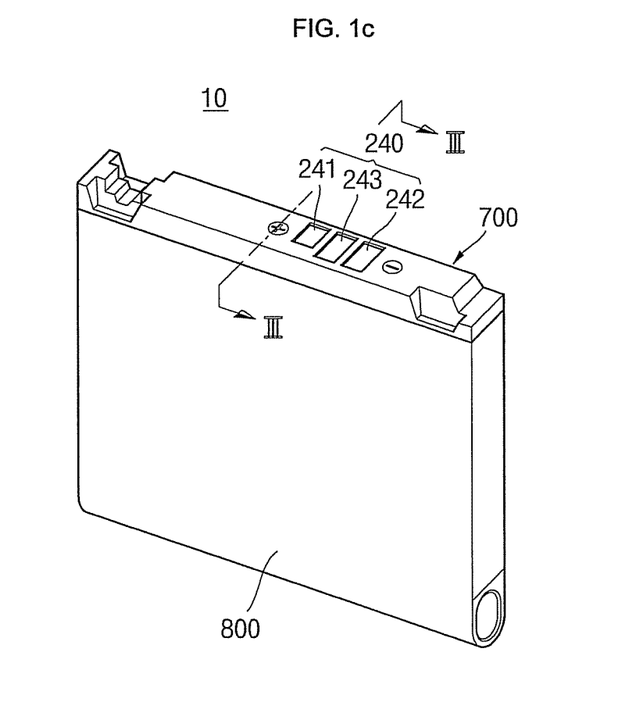
FIG. 1c is a perspective view illustrating the battery pack of FIG. 1a, as assembled.
Figure 1D:
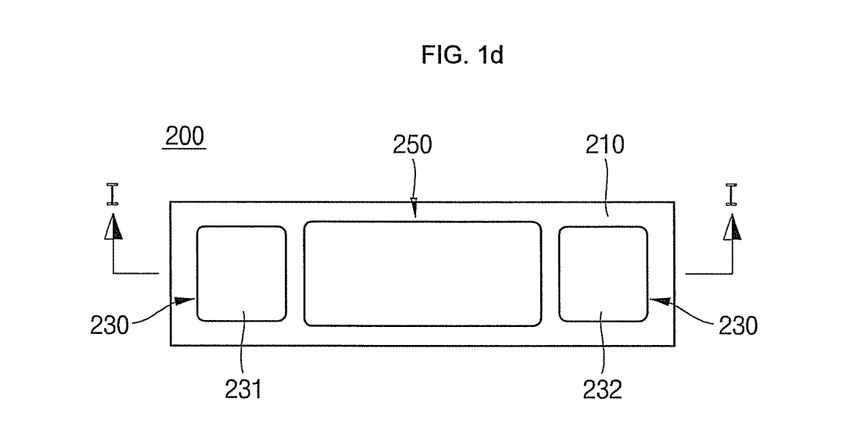
Figure 1E:
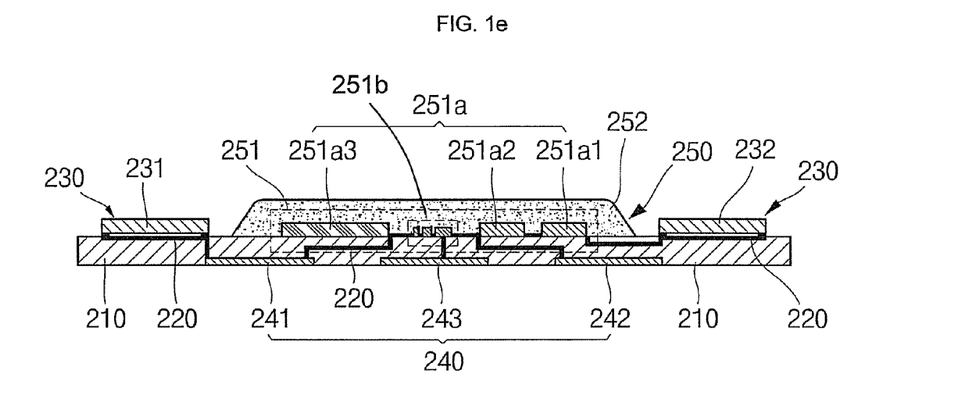
FIG. 1e is a cross-sectional view of the COB module, taken along line 'I-I' of FIG. 1d.
Figure 1F:
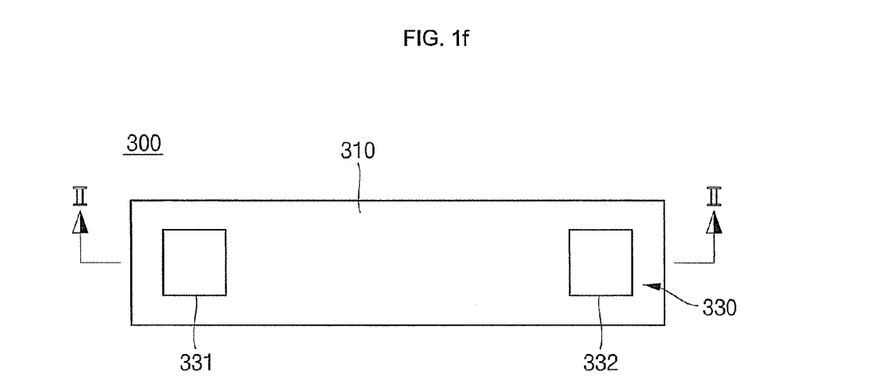
Figure 1G:
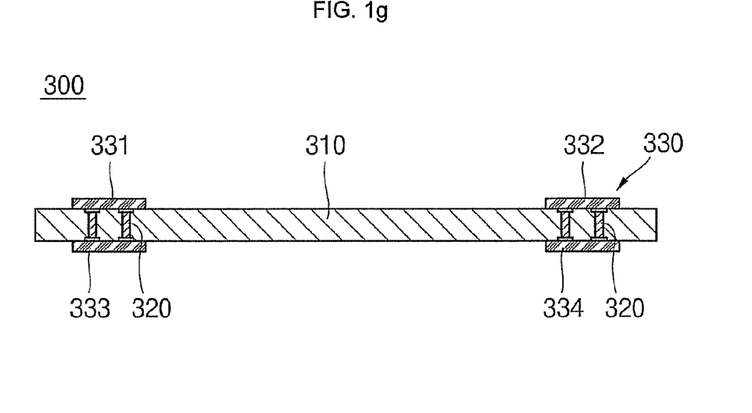
FIG. 1g is a cross-sectional view of the seating substrate, taken along line 'II-II' of FIG. 1f.
Figure 1H:
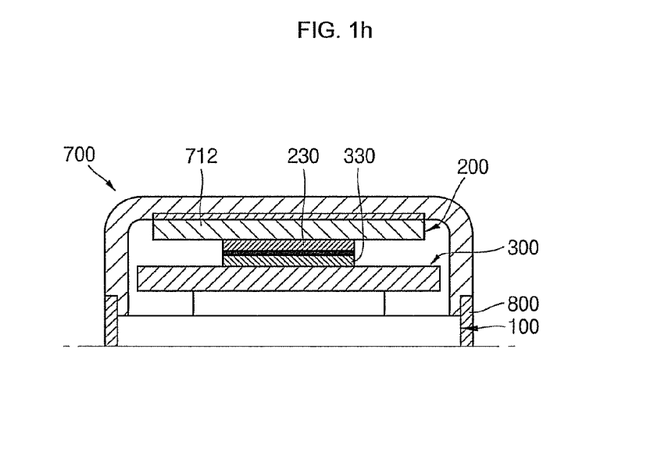
FIG. 1h is a partial cross-sectional view of the battery pack, taken along line 'III-III' of FIG. 1c.

FIG. 1a is an exploded perspective view of a battery pack, according to one exemplary embodiment of the present disclosure. FIG. 1b illustrates a partially assembled state of the battery pack. FIG. 1c is a perspective view illustrating an assembled state of the battery pack. FIG. 1d is a bottom view illustrating a COB module of FIG. 1a. FIG. 1e is a cross-sectional view of the COB module, taken along line 'I-I' of FIG. 1d. FIG. 1f is a plan view of a seating substrate of FIG. 1a. FIG. 1g is a cross-sectional view of the seating substrate taken along line 'II-II' of FIG. 1f. FIG. 1h is a partial cross-sectional view of the battery pack, taken along line 'III-III' of FIG. 1c.

Referring to FIGS. 1a to 1h, a battery pack 10, according to one exemplary embodiment of the present disclosure, includes a bare cell 100, a COB (chip on board) module 200, a seating substrate 300, a positive temperature coefficient (PTC) element 400, lead tabs 500, and an insulating tape 600. The battery pack 10 further includes a case 700 and a label 800.

The bare cell 100 includes an electrode assembly (not shown) including a cathode 110 and an anode 120, and an electrolyte (not shown). The bare cell 100 may be a can-type battery, which includes a can 130 to house the electrode assembly and the electrolyte. The can 130 can be metallic and can be formed by a deep-drawing method. The bare cell 100 may be a pouch-type battery, which includes a pouch having an aluminum layer, in place of the can 130. According to this exemplary embodiment, the bare cell 100 is shown as a can-type battery.

The COB module 200 includes an insulating substrate 210, a printed circuit pattern 220, conductive pads 230, charge/discharge terminals 240, and a central processing unit 250. The central processing unit 250 can be directly mounted on and electrically interconnected to the substrate 210, by a COB process, instead of undergoing traditional assembly or packaging as an individual integrated circuit. Thus, the central processing unit 250 may also be referred to as a COB chip 250. The COB module 200 is electrically coupled to the cathode 110 and anode 120, and controls charging/discharging (the current flow) of the bare cell 100. The COB module 200 is sized to be included within the battery pack 10. Accordingly, the COB module 200 can be disposed at a long side surface, or a short side surface, of the bare cell 100. The COB module 200 can be electrically connected to the bare cell 100, with lead tabs 500.

The substrate 210 can be formed of Bakelite, or a polymer resin, such as an epoxy resin. The substrate 210 generally includes a plurality of stacked insulating layers. The printed circuit pattern 220 is formed of a conductive metal, such as copper. The printed circuit pattern 220 may extend between upper and lower surfaces of the substrate 210, i.e., through holes defined in the substrate 210.

The conductive pads 230 include a first conductive pad 231 and a second conductive pad 232. The first conductive pad 231 is connected to a first conductive terminal 331 of the seating substrate 300, by soldering, for example. In addition, the first conductive pad 231 is connected to the printed circuit pattern 220 and is thereby electrically connected to a cathode terminal 241 of the charge/discharge terminals 240.

The second conductive pad 232 is connected to a second conductive terminal 332 of the seating substrate 300, by soldering, for example. The second conductive pad 232 is connected to the printed circuit pattern 220 and is thereby electrically coupled to charge and discharge switching elements 251$a$1 and 251$a$2.

The conductive pads 230 may be thicker than the printed circuit pattern 220, in order to be welded or soldered to another metal member. The conductive pads 230 may be formed of nickel or a nickel-containing alloy, to improve conductivity.

The charge/discharge terminals 240 include a cathode terminal 241, an anode terminal 242, and an auxiliary terminal 243. The charge/discharge terminals 240 are electrically coupled to the printed circuit pattern 220 and are formed on an upper surface of the substrate 210. The charge/discharge terminals 240 can be used as contacts to electrically couple a portable electronic device (not shown) to the bare cell 100. The width of the charge/discharge terminals 240 is narrower than that of a side of the bare cell 100, on which the terminals 240 are disposed. Accordingly, the terminals 240 do not increase the thickness of the battery pack 100.

The cathode terminal 241 is spaced by the predetermined distance from the auxiliary terminal 243 and is disposed at one side of the auxiliary terminal 243. The cathode terminal 241 is electrically connected to the first conductive pad 231, via the printed circuit pattern 220.

The anode terminal 242 is spaced by the predetermined distance from the auxiliary terminal 243 and is provided at an opposing side of the auxiliary terminal 243. The anode terminal 242 is electrically connected to the charge and discharge switching elements 251$a$1 and 251$a$2, via the printed circuit pattern 220.

The auxiliary terminal 243 is disposed between the cathode and anode terminals 241 and 242, in the middle of the substrate 210. The auxiliary terminal 243 is electrically coupled to a control circuit 251$a$3, via the printed circuit 220. The control circuit 251$a$3 determines whether the bare cell 100 is being charged or discharged.

The auxiliary terminal 243 is provided in the middle of the substrate 210, to conform with a commonly used terminal configuration. The spacing of the cathode, anode, and auxiliary terminals, 241, 242, and 243 is set to be within an allowable tolerance range, such that the COB module 200 can be connected to a variety of devices. In other words, the charge/discharge terminals 240 are manufactured with a simplified structure. Accordingly, the manufacturing and maintenance costs, thereof, are reduced.

The central processing unit 250 includes electrical elements 251 and an insulator 252. The electrical elements 251 include active elements 251$a$ and a passive element 251$b$. The electrical elements 251 are coated with the insulator 252. The active elements 251$a$ include the charge and discharge switching elements 251$a$1 and 251$a$2, and the control circuit 251$a$3.

The charge switching element 251$a$1 is connected to the printed circuit pattern 220 and is seated on the substrate 210. The charge switching element 251$a$1 can be an FET (field effect transistor) and can be turned on when the bare cell 100 is charged. The discharge switching element 251$a$2 can be turned off during charging, to allow only the charging current to flow.

The discharge switching element 251$a$2 is connected to the printed circuit pattern 220 and is seated on the substrate 210. The discharge switching element 251$a$2 can be an FET and can be turned on during discharging of the bare cell 100. The charge switching element 251$a$1 can be turned off during the discharging, to allow only the discharging current to flow.

The control circuit 251$a$3 is an integrated semiconductor element. The control circuit 251$a$3 is electrically connected to the charge and discharge switching elements 251$a$1 and 251$a$2, by the printed circuit pattern 220. The control circuit 251$a$3 controls the switching operations of the charge and discharge switching elements 251$a$1 and 251$a$2. The charge switching element 251$a$1 is turned on by the control circuit 251$a$3, during charging of the bare cell 100. The discharge switching element 251$a$2 is turned on by the control circuit 251$a$3, during discharging of the bare cell 100.

When an excessive charging voltage is applied to the bare cell 100, the charge switching element 251$a$1 is turned off by the control circuit 251$a$3, to prevent the bare cell 100 from being overcharged. When the bare cell 100 is over-discharged, the discharge switching element 251$a$2 is turned off by the control circuit 251$a$3, and the bare cell 100 is protected from being over-discharged. In other words, the bare cell 100 is overcharged or over-discharged, the charge and/or discharge switching elements 251$a$1 and 251$a$2 are turned off by the control circuit 251$a$3, and thus, the bare cell 100 is prevented from overheating or being damaged.

The control circuit 251$a$3 has a temperature sensing operation. When the control circuit 251$a$3 detects that the bare cell 100 is too hot, the charge and discharge switching elements 251$a$1 and 251$a$2 are switched off by the control circuit 251$a$3. Thus, the current flow in the bare cell 100 is cut off when a specific temperature is detected. According to the exemplary embodiment, the control circuit 251$a$3 controls an electrical coupling to the bare cell 100, by connecting or cutting off a current path to the anode 120 of the bare cell 100.

The passive element 251$b$ may be an electrical element, such as a resistor, a capacitor, and/or an inductor. The passive element 251$b$ is electrically coupled to the printed circuit pattern 220 and is disposed on an upper surface of the substrate 210. The passive element 251$b$ is electrically coupled to the active element 251$a$. The passive element 251$b$ controls the voltage and current that is applied to the active element 251$a$.

The insulator 252 surrounds the electrical elements 251 and prevents the electrical elements 251 from being shorted by foreign materials. The insulator 252 may be bonded to the substrate 210. The insulator 252 can be an injection molded frame formed of a polymer resin, such as an epoxy resin. The insulator 252 is disposed on the substrate 210 and covers the electrical elements 251, to prevent the electrical elements 251 from being exposed to the outside. In other words, the insulator 252 insulates the electrical elements 251 and fixes the electrical elements 251 to the substrate 210. Accordingly, the electrical elements 251 are integrated with the substrate 210, together with the charge/discharge terminals 240 and the conductive pads 230. Thus the COB module 200 is formed in a simplified structure.

The insulator 252 is molded to the central processing unit 250, where the electrical elements 251 are installed on the substrate 210. The central processing unit 250 is provided in the middle of the substrate 210. The central processing unit 250 has a simplified structure that is easier to install than a conventional processing unit, where each electrical element is a semiconductor chip package that is separately installed on a PCB (printed circuit board).

The first and second conductive pads 231 and 232 are respectively provided on opposing sides of the central processing unit 250. In other words, current paths to the cathode 110 and the anode 120 are spaced by a predetermined distance. Accordingly, the probability of a short between the cathode 110 and anode 120 is greatly reduced. The structure of the COB module 200 is simplified. Accordingly, manufacturing costs of the COB module 200 are reduced.

The central processing unit 250 is provided on a lower surface of the substrate 210. The charge/discharge terminals 240 are provided on an upper surface of the substrate 210. Accordingly, the charge/discharge terminals 240 can be readily connected to a portable electronic device. In addition, the central processing unit 250 and the charge/discharge terminals 240 correspond to each other. The structure of the printed circuit pattern 220 is simplified, and the substrate 210 has a stacked formation. Accordingly, the structure of the COB module 200 is very simplified, and thus, the manufacturing cost thereof is reduced.

The surface area of the upper surface of the substrate 210 is 120% to 400% greater than the surface area of the exposed surfaces charge/discharge terminals 240. The COB module 200 is assembled with the conductive pads 230 and the central processing unit 250, and thus, the surface area of the upper surface of the substrate 210 can be about 120% greater than the surface area of the exposed surfaces of charge/discharge terminals 240. Thus the installation spaces for the central processing unit 250 and the conductive pads 230 are occupied. In addition, the area of the upper surface of the substrate 210 is less than 400% larger than the exposed surface areas of the charge/discharge terminals 240. Accordingly, the structure and size of the COB module 200 are improved.

The structure of the COB module 200 is simplified, and thus, the COB module can be used even if the structure of the battery pack 10 is changed. Accordingly, the manufacturing cost thereof is reduced. In addition, the COB module 200 controls the current flow of the bare cell 100, when the bare cell 100 is charged or discharged. The COB module 200 is arranged at one side of the bare cell 100, so as not to increase the thickness of the battery pack 10.

The seating substrate 300 includes an insulating substrate 310, a printed circuit pattern 320, and conductive terminals 330. The substrate 310 is generally made of the same material as the substrate 210. The substrate 310 is longer than the substrate 210, so as to seat the COB module 200.

The printed circuit pattern 320 extends though holes formed in the substrate 310. In addition, the printed circuit pattern 320 is formed on upper and lower portions of the substrate 310, and forms an installation space for connecting to the conductive terminals 330. The printed circuit pattern 320 may be formed of a conductive metal material, such as copper.

The conductive terminals 330 are seated on opposing surfaces of the substrate 310. In addition, the conductive terminals 330 are electrically coupled to the conductive pads 230.

The conductive terminals 330 include first, second, third, and fourth conductive terminals 331, 332, 333, and 334.

The first conductive terminal 331 is seated on an upper surface of the substrate 310 and is electrically coupled to the first conductive pad 231, by the printed circuit pattern 320. The first conductive terminal 331 and the first conductive pad 231 may be coupled by soldering, for example. The second conductive terminal 332 is seated on the upper surface of the substrate 310 and is electrically coupled to the second conductive pad 232, by the printed circuit pattern 320. The second conductive terminal 332 and the second conductive pad 232 may be coupled by soldering, for example.

The third conductive terminal 333 is seated on a lower surface of the substrate 310 and is connected to the PTC element 400. The third conductive terminal 333 and the PTC element 400 may be connected by soldering, for example. The forth conductive terminal 334 is seated on a lower portion of the substrate 310 and is connected to the second lead tab 520 by soldering, for example.

The first and third conductive terminals 331 and 333 face one another on opposite sides of the substrate 310, and are electrically connected by the printed circuit pattern 320, which extends through a hole in the substrate 310. The second and fourth terminals 332 and 334 face one another on opposite sides of the substrate 310, and are electrically connected by the printed circuit pattern 320, which extends through a hole in the substrate 310. Accordingly, the arrangement of the conductive terminals 330 simplify the electrical wiring, and thus, the manufacturing cost of the seating substrate 300 is reduced. The conductive terminals 330 can be formed of nickel, or a nickel-containing alloy, to improve the conductivity and soldering thereof.

The seating substrate 300 electrically couples the bare cell 100 to the COB module 200. The seating substrate 300 structurally attaches the COB module 200 to the bare cell 100, to efficiently use the COB module 200, as a common COB module.

The PTC element 200 is connected to the first lead tab 510 and the third conductive terminal 333, to electrically couple the seating substrate 300 to the bare cell 100. In addition, the PTC element 400 is provided at the side of the bare cell 100, so as not to increase the thickness of the battery pack 10. When the temperature of the bare cell 10 rises above a critical temperature, the internal resistance of the PTC element 400 increases to cut off the current flow of the bare cell 100.

The lead tabs 500 include first and second lead tabs 510 and 520. The first lead tab 510 electrically couples the cathode 110 to the PTC element 400. The first lead tab 510 is bent around a corner of the bare cell 100. The first lead tab 510 is provided at a side of the battery pack 10, so as not to increase the thickness of the battery pack 10. The second lead tab 520 electrically couples the anode 120 to the fourth conductive terminal 334. The second lead tab 520 is bent around another corner of the bare cell 100.

The first and second lead tabs 510 and 520 are electrically coupled to the seating substrate 300. In addition, the first and second lead tabs 510 and 520 are electrically coupled to the COB module 200. Here, the first and second lead tabs 510 and 520, the seating substrate 300, and the COB module 200 form a 'U' around three sides of the battery pack 10. Accordingly, the thickness of the battery pack 10 is not increased.

The tape 600 is coated on two sides with an adhesive and bonds the lead tabs 500 to the bare cell 100. The tape 600 insulates the second lead tab 520 from the cathode 110.

The case 700 includes an upper cover 710, a first side cover 720, and a second side cover 730. The upper cover 710 surrounds the COB module 200. The upper cover 710 includes charge/discharge terminal holes 711 corresponding to the charge/discharge terminals 240.

The first side cover 720 surrounds a first side of the bare cell 100 and is bonded to the first lead tab 510. The first side cover 720 prevents the first lead tab 510 from being externally shorted. The second side cover 730 surrounds a second side of the bare cell 100 and is bonded to the second lead tab 520. The second side cover 730 prevents the second lead tab 520 from being externally shorted. The first side cover 720 and the second side cover 730 are provided with wing portions to surround the respective sides of the bare cell 100 and to protect edges of the bare cell 100 from external impacts.

The case 700 surrounds the COB module to protect the COB module 200. The case 700 includes the charge/discharge holes 711, which expose the charge/discharge terminals 240 to the outside. The case 700 may be integrated with the COB module 200. The case 700 and the COB module 200 may be mechanically or chemically adhered to one another.

Referring to FIG. 1h, a double-sided adhesive tape 712 is provided inside the case 700. The double-sided adhesive tape 712 adheres the substrate 210 of COB module 200 to the case 700. Accordingly, the COB module 200 is integrated with the case 700, and the positions of charge/discharge terminals 240 are maintained with respect to the charge/discharge terminal holes 711.

The label 800 surrounds the first and second side covers 720 and 730 and the bare cell 100. Accordingly, the label 800 helps to attach the case 700 to the bare cell 100.

As described above, the COB module 200 controls the charging/discharging of the bare cell 100 and can be commonly used in various types of batteries. Accordingly, manufacturing costs are reduced. The COB module 200 is configured for easy tolerance control. Accordingly, maintenance costs are reduced.

The battery pack 10 integrates the seating substrate 300, the PTC element 400, the lead tabs 500, the case 600, and the COB module 200. Accordingly, the structure thereof is greatly simplified. The COB module 200 improves the durability of the bare cell 100 and prevents the overheating and degradation of the bare cell 100, by controlling the current flow of the bare cell 100. Accordingly, the stability of the battery pack 10 is improved.

The COB module 200 integrates the central processing unit 250, the charge/discharge terminals 240, and the conductive pads 230, and thus, installation spaces are reduced, as compared to a conventional substrate. In addition, in the battery pack 10, the COB module 200, the seating substrate 300, the lead tabs 500, and the PTC element 400 are provided at a side of the bare cell 100. Accordingly, the thickness of the battery pack 10 is not increased.

Figure 2:
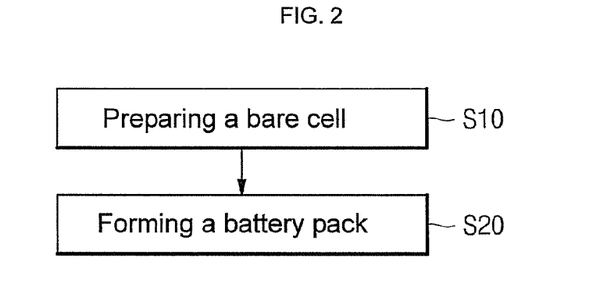
FIG. 2 is a flow chart illustrating a process of manufacturing a battery pack, according to one exemplary embodiment of the present disclosure.

FIG. 2 is a flow chart illustrating a manufacturing method of the battery pack 10, according to one exemplary embodiment of the present disclosure. FIGS. 3a to 3d are process charts showing the manufacturing method of the battery pack 10. Referring to FIG. 2, the manufacturing method includes preparing a bare cell (operation S10) and forming a pack (operation S20).

Figure 3A:
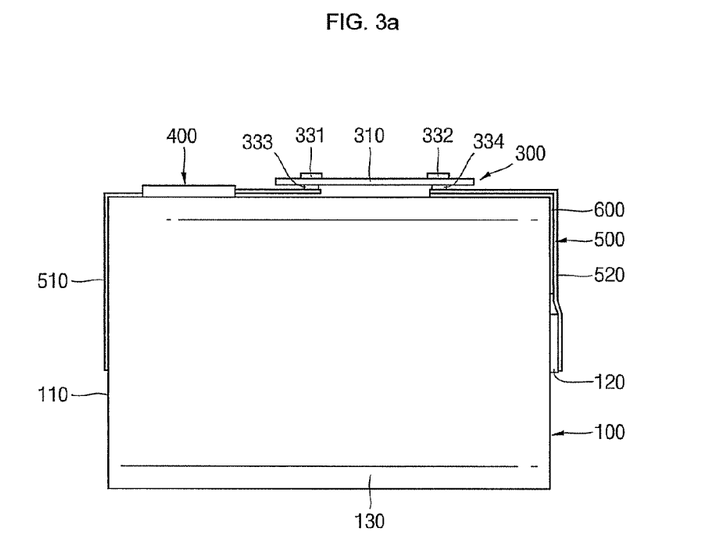
FIGS. 3a to 3d are process charts illustrating the manufacturing process.
Figure 3B:
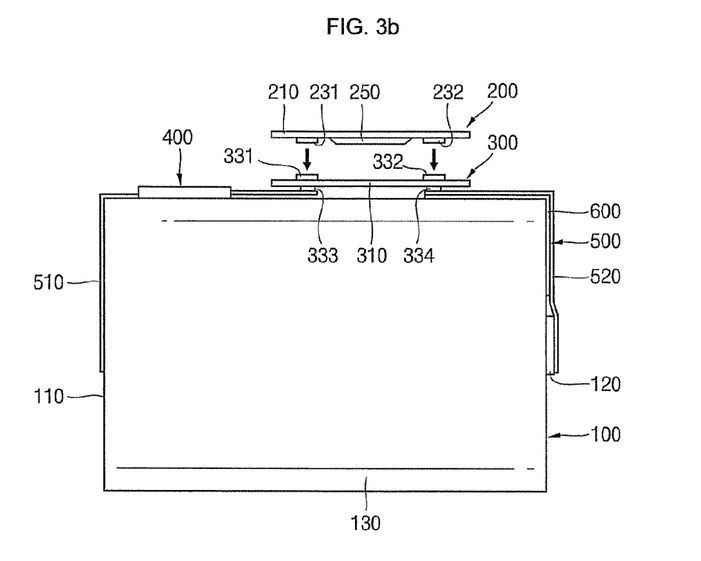
Figure 3C:
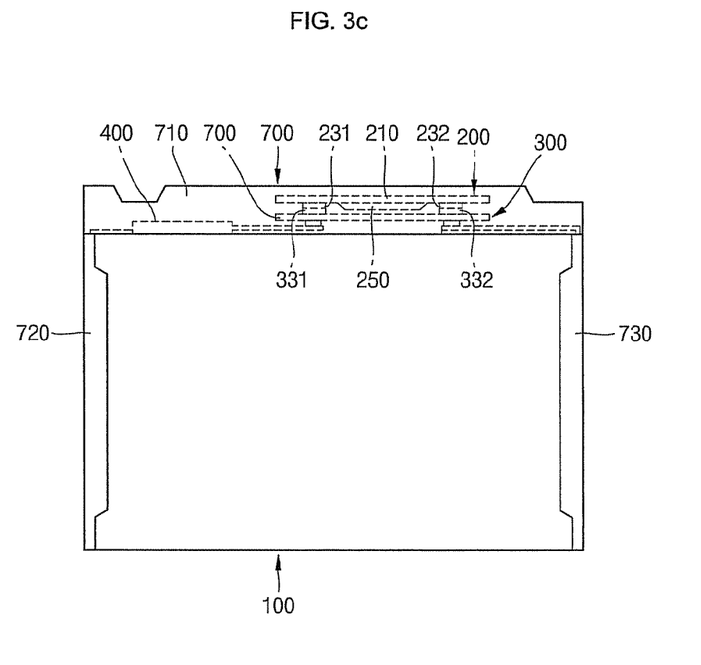
Figure 3D:
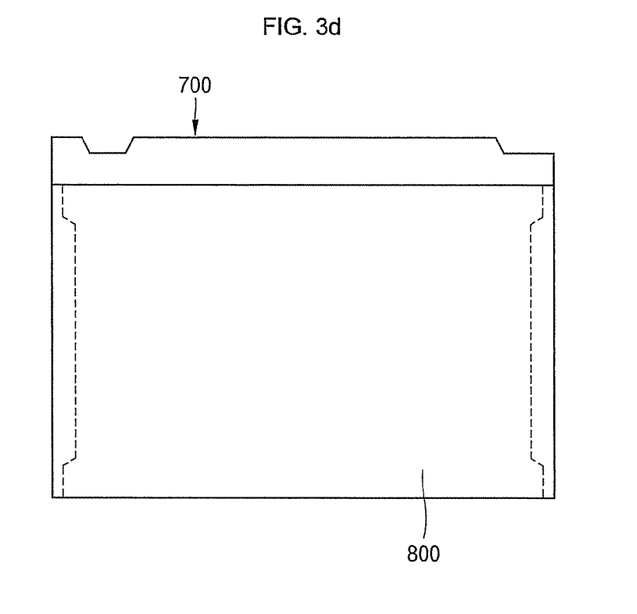

Referring to FIG. 3a, in operation S10, the bare cell 100, including the cathode 110 and the anode 120, is prepared. The lead tabs 500 are attached to the cathode 110 and anode 120 and to the seating substrate 300.

In operation S20 (referring to FIG. 3b), the COB module 200 is electrically coupled to the cathode 110 and anode 120, via the seating substrate 300. The COB module 200 is electrically coupled to the seating substrate 300, which is electrically coupled to the bare cell 100. The COB module 200 is seated on the seating substrate 300. Then, referring to FIG. 3c, the bare cell 100 is surrounded by the cover 700. The COB module 200 includes the central processing unit 250 and the conductive pads 231 and 232, which are electrically coupled to the printed circuit pattern 220.

In the manufacturing method of the battery pack, the COB module 200 is combined to the seating substrate 300, and then the COB module 200 is covered with the case 700. Accordingly, the manufacturing process is simplified, and the manufacturing costs are reduced. In addition, the COB module 200 can be a common COB module, which is integrally formed with the central processing unit 250, the charge/discharge terminals 240, and the first and second conductive pads 231 and 232. Accordingly, the manufacturing time for the battery pack 10 is reduced, and the manufacturing cost is reduced.

Referring to FIG. 1h, the COB module 200 is integrally combined to the case 700. The bare cell 100 and the COB module 200 may be electrically coupled to each other, and the bare cell 100 may be surrounded with the case 700. The COB module 200 is combined to the case 700 and the manufacturing process is simplified. Accordingly, the manufacturing time is reduced, and thus, manufacturing costs are reduced.

As described above, a battery pack, according to aspects of the present disclosure, produces the following effects. First, the battery pack uses the common COB module that can control the charging/discharging of the bare cell, and be used regardless of the kind of the battery, thereby reducing maintenance costs and manufacturing costs. The COB module has a simplified structure, which facilitates installation, thereby reducing manufacturing process and time.

Although a few exemplary embodiments of the present invention have been shown and described, it would be appreciated by those skilled in the art that changes may be made in these embodiments, without departing from the principles and spirit of the invention, the scope of which is defined in the claims and their equivalents.

What is claimed is:

1. A battery pack, comprising:
a bare cell comprising a cathode and an anode;
a chip on board (COB) module, electrically connected to the cathode and to the anode of the bare cell, and configured to control current flow to or from the bare cell;
a seating substrate to attach the COB module to the bare cell; and
lead tabs to electrically connect the bare cell and the seating substrate,
wherein the COB module comprises:
an insulating substrate,
a central processing unit positioned on a first surface of the insulating substrate,
conductive pads disposed on the first surface of the insulating substrate,
a plurality of terminals disposed on a second surface of the insulating substrate, wherein the second surface is opposite the first surface, and
a circuit pattern printed on the first and the second surfaces of the insulating substrate and through the first surface to the second surface of the insulating substrate, wherein the circuit pattern electrically connects the conductive pads to both the terminals and to the central processing unit,
wherein the central processing unit comprises:
a plurality of electrical elements electrically connected to the circuit pattern; and
an insulator encapsulating the plurality of the electrical elements and fixing the plurality of electrical elements to the first surface of the insulating substrate, wherein the seating substrate comprises:
  a second insulating substrate;
  conductive terminals disposed on opposing sides of the second substrate; and
  printed circuit patterns to electrically interconnect opposing pairs of the conductive terminals,
wherein the conductive terminals comprise:
  a first conductive terminal and a second conductive terminal seated on an upper surface of the second insulating substrate; and
  a third conductive terminal and a fourth conductive terminal seated on a lower surface of the second insulating substrate, wherein the third conductive terminal and the fourth conductive terminal are located directly opposite the first conductive terminal and the second conductive terminal, respectively,
  wherein the first and second conductive terminals are connected to the conductive pads of the COB module, and wherein the third and fourth conductive terminals are connected to the lead tabs.

2. The battery pack of claim 1, wherein the terminals comprise:
  a cathode terminal;
  an anode terminal: and
  an auxiliary terminal disposed between the cathode terminal and anode terminal.

3. The battery pack of claim 1, wherein the electrical elements comprise:
  a charge switching element that is switched on to charge the bare cell;
  a discharge switching element that is switched on to discharge the bare cell; and
  a control circuit to control the switching of the charge and discharge switching elements.

4. The battery pack of claim 1, wherein the insulator comprises an epoxy resin or a polymer resin comprising an epoxide.

5. The battery pack of claim 1, wherein the insulator is bonded to the insulating substrate.

6. The battery pack of claim 1, wherein the central processing unit is disposed at the middle of the insulating substrate and the conductive pads are disposed on opposing sides of the central processing unit.

7. The battery pack of claim 1, wherein the central processing unit faces the terminals.

8. The battery pack of claim 1, wherein the surface area of the second surface of the insulating substrate is 120% to 400% greater than the surface area of exposed portions of the terminals.

9. The battery pack of claim 1, wherein the seating substrate electrically couples the bare cell to the COB module.

10. The battery pack of claim 1, further comprising a PTC element to electrically connect the seating substrate and the bare cell.

11. The battery pack of claim 1, wherein the lead tabs comprise:
  a first lead tab to electrically connect the cathode and the COB module; and
  a second lead tab to electrically connect the anode and the COB module.

12. The battery pack of claim 11, further comprising an insulating tape to attach the second lead tab to the bare cell.

13. The battery pack of claim 1, further comprising a case to cover the COB module, the case having holes corresponding to the terminals.

14. The battery pack of claim 13, wherein the case is disposed around three sides of the bare cell.

15. The battery pack of claim 13, wherein the COB module is disposed on a side surface of the bare cell that faces the case.

* * * * *